US011194495B2

(12) United States Patent
Dalmatov

(10) Patent No.: US 11,194,495 B2
(45) Date of Patent: Dec. 7, 2021

(54) BEST-EFFORT DEDUPLICATION OF DATA WHILE THE DATA RESIDES IN A FRONT-END LOG ALONG AN I/O PATH THAT LEADS TO BACK END STORAGE

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 686 days.

(21) Appl. No.: 16/078,364

(22) PCT Filed: Apr. 27, 2017

(86) PCT No.: PCT/RU2017/000274
§ 371 (c)(1),
(2) Date: Aug. 21, 2018

(87) PCT Pub. No.: WO2018/199795
PCT Pub. Date: Nov. 1, 2018

(65) Prior Publication Data
US 2021/0191639 A1    Jun. 24, 2021

(51) Int. Cl.
*G06F 3/06* (2006.01)

(52) U.S. Cl.
CPC .......... *G06F 3/0641* (2013.01); *G06F 3/0608* (2013.01); *G06F 3/0659* (2013.01); *G06F 3/0673* (2013.01)

(58) Field of Classification Search
CPC .... G06F 3/0608; G06F 3/0641; G06F 3/0659; G06F 3/0673

(Continued)

(56) References Cited

U.S. PATENT DOCUMENTS 5,345,584 A   9/1994  Hill
5,734,861 A   3/1998  Cohn et al.
(Continued)

FOREIGN PATENT DOCUMENTS

WO    20160072971    5/2016

OTHER PUBLICATIONS

Y. Fu, H. Jiang, N. Xiao, L. Tian, F. Liu and L. Xu, "Application-Aware Local-Global Source Deduplication for Cloud Backup Services of Personal Storage," in IEEE Transactions on Parallel and Distributed Systems, vol. 25, No. 5, pp. 1155-1165, May 2014, doi: 10.1109/TPDS.2013.167. (Year: 2014).*

(Continued)

*Primary Examiner* — Reginald G Bragdon
*Assistant Examiner* — Aaron D Ho
(74) *Attorney, Agent, or Firm* — BainwoodHuang

(57) ABSTRACT

A technique performs best-effort deduplication. The technique involves activating a front-end log deduplication service that is configured and operative to perform deduplication operations on data in front-end log-based storage prior to that data reaching back-end storage that is different from the front-end log-based storage. The technique further involves, after the front-end log deduplication service is activated, receiving new data in the front-end log-based storage. The technique further involves, providing the front-end log deduplication service to perform a data deduplication operation on the new data while the new data resides within the front-end log-based storage. The technique further involves, after the data deduplication operation is performed on the new data, updating the back-end storage to indicate storage of the new data within the back-end storage.

19 Claims, 5 Drawing Sheets

(58) Field of Classification Search
USPC .......................................................... 711/154
See application file for complete search history.

(56) References Cited

U.S. PATENT DOCUMENTS

| | | | |
|---|---|---|---|
| 6,173,306 | B1 | 1/2001 | Raz et al. |
| 8,706,960 | B1 | 4/2014 | Ives et al. |
| 8,935,493 | B1 | 1/2015 | Dolan et al. |
| 9,311,002 | B1 | 4/2016 | Scott et al. |
| 9,330,105 | B1 | 5/2016 | Duprey et al. |
| 9,383,940 | B1 | 7/2016 | Ives et al. |
| 9,594,514 | B1 | 3/2017 | Bono et al. |
| 9,684,593 | B1 | 6/2017 | Chen et al. |
| 9,703,664 | B1 | 7/2017 | Alshawabkeh et al. |
| 9,940,033 | B1 | 4/2018 | Alshawabkeh et al. |
| 9,965,218 | B1 | 5/2018 | Martin et al. |
| 10,025,523 | B1 | 7/2018 | Dagan et al. |
| 10,073,621 | B1 | 9/2018 | Foley et al. |
| 10,078,569 | B1 | 9/2018 | Alshawabkeh et al. |
| 10,089,026 | B1 | 10/2018 | Puhov et al. |
| 10,095,425 | B1 | 10/2018 | Martin |
| 10,126,988 | B1 | 11/2018 | Han et al. |
| 10,140,041 | B1 | 11/2018 | Dong et al. |
| 10,146,447 | B1 | 12/2018 | Dong et al. |
| 10,146,456 | B1 | 12/2018 | Gao et al. |
| 10,146,459 | B1 | 12/2018 | Gao et al. |
| 10,146,624 | B1 | 12/2018 | Gong et al. |
| 10,146,646 | B1 | 12/2018 | Foley et al. |
| 10,152,254 | B1 | 12/2018 | Kang et al. |
| 10,282,256 | B1 * | 5/2019 | Patil .................... G06F 16/1748 |
| 2002/0095532 | A1 | 7/2002 | Surugucchi et al. |
| 2003/0065883 | A1 | 4/2003 | Bachmat |
| 2006/0161807 | A1 | 7/2006 | Dawkins |
| 2006/0212746 | A1 | 9/2006 | Amegadzie et al. |
| 2008/0028164 | A1 | 1/2008 | Ikemoto et al. |
| 2008/0059749 | A1 | 3/2008 | Gerber et al. |
| 2008/0109601 | A1 | 5/2008 | Klemm et al. |
| 2010/0250501 | A1 | 9/2010 | Mandagere et al. |
| 2012/0166401 | A1 * | 6/2012 | Li ........................ G06F 16/2246 |
| | | | 707/692 |
| 2012/0259901 | A1 | 10/2012 | Lee et al. |
| 2013/0275653 | A1 | 10/2013 | Ranade et al. |
| 2014/0095439 | A1 | 4/2014 | Ram |
| 2015/0134926 | A1 | 5/2015 | Yang et al. |
| 2016/0188401 | A1 | 6/2016 | Shen et al. |
| 2016/0342338 | A1 * | 11/2016 | Wang .................. G06F 12/0877 |
| 2016/0364149 | A1 | 12/2016 | Klemm et al. |
| 2017/0285972 | A1 | 10/2017 | Dalmatov |

OTHER PUBLICATIONS

Kiran Srinivasan, Tim Bisson, Garth Goodson, and Kaladhar Voruganti. 2012. "iDedup: Latency-aware, inline data deduplication for primary storage". In Proceedings of the USENIX Conference on File and Storage Technologies (FAST). USENIX, Berkeley, CA, 1-14 (Year: 2012).*

Yingying Tian, Samira M. Khan, Daniel A. Jimenez, and Gabriel H. Loh. 2014. Last-level cache deduplication. In Proceedings of the 28th ACM international conference on Supercomputing (ICS '14). Association for Computing Machinery, New York, NY, USA, 53-62. DOI:https://doi.org/10.1145/2597652.2597655 (Year: 2014).*

W. Zhang, H. Tang, H. Jiang, T. Yang, X. Li and Y. Zeng, "Multi-level Selective Deduplication for VM Snapshots in Cloud Storage," 2012 IEEE Fifth International Conference on Cloud Computing, 2012, pp. 550-557, doi: 10.1109/CLOUD.2012.78. (Year: 2012).*

Y. J. Nam, D. Park and D. H. C. Du, "Assuring Demanded Read Performance of Data Deduplication Storage with Backup Datasets, " 2012 IEEE 20th International Symposium on Modeling, Analysis and Simulation of Computer and Telecommunication Systems, 2012, pp. 201-208, doi: 10.1109/MASCOTS.2012.32. (Year: 2012).*

EMC, "EMC CELERRA Automated Storage Tiering Applied Best Practices Guide", Aug. 2009, P/N h6499, pp. 1-36.

EMC, "EMC VNX2 Unified Best Practices for Performance Applied Best Practice Guide", Oct. 2005, P/N H10938.8, pp. 1-37.

EMC, "Managing Data Relocation in Storage Systems", U.S. Appl. No. 13/929,664, filed Jun. 27, 2013.

Tomek, "EMC VNX-Fast VP Explained—Storage Freak", retrieved from http://www.storagefreak.net/2014/06/emc-vnx-fast-vp-explained, Jun. 2, 2014, pp. 1-6.

International Search Report and the Written Opinion from International Searching Authority (RU) for International Application No. PCT/RU2017/000274, dated Nov. 2, 2017, 8 pages.

* cited by examiner

BEST-EFFORT DEDUPLICATION OF DATA WHILE THE DATA RESIDES IN A FRONT-END LOG ALONG AN I/O PATH THAT LEADS TO BACK END STORAGE

BACKGROUND

Data deduplication eliminates duplicate copies of the same data by storing a single instance of that data within secondary storage (i.e., non-volatile computerize memory that sits below primary/main memory). Along these lines, suppose that a first copy of certain data is already stored within secondary storage. Later, suppose that a second copy of that data arrives for storage. In such a situation, the second copy is replaced with a small reference that points to the first copy thus eliminating the need to store multiple copies of the data within secondary storage.

There are two conventional deduplication approaches. Conventional inline deduplication involves determining whether there is a duplicate copy of data while the data is undergoing processing along the input/output (I/O) path en route to secondary storage. Conventional background (or offline) deduplication involves determining whether multiple copies of data already exist within secondary storage and, if so, eliminating extra copies of the data from secondary storage.

SUMMARY

It should be understood that there are deficiencies to the above-described conventional deduplication approaches. In particular, conventional inline deduplication may delay completion of a write operation from a host computer's perspective. Unfortunately, any delays in acknowledging completion of a write operation may be unacceptable.

Additionally, conventional background deduplication is inefficient. Along these lines, stored metadata which identifies the data already in secondary storage must be read from secondary storage and evaluated against other stored metadata to determine whether multiple copies of data exist within secondary storage.

In contrast to the above-described conventional deduplication approaches, improved techniques are directed to performing a deduplication operation on data while that data resides in a front-end log along the input/output (I/O) path that leads to back-end storage (e.g., secondary storage). Such operation enables I/O transactions to be acknowledged as completed as soon as the data reaches the front-end log and thus does not impose any delays. Additionally, such operation may eliminate storing multiple copies of the data in back-end storage which could then lead to inefficiencies (e.g., processing more data in a subsequent deduplication process, reading and evaluating stored metadata, etc.). Moreover, such operation can be applied in a best-effort manner so that the deduplication service may be deactivated under certain situations (e.g., due to data building up in the front-end log, if there are no available processing cycles available for deduplication, etc.).

One embodiment is directed to a method of performing best-effort deduplication. The method includes activating a front-end log deduplication service that is configured and operative to perform deduplication operations on data in front-end log-based storage prior to that data reaching back-end storage that is different from the front-end log-based storage. The method further includes, after the front-end log deduplication service is activated, receiving new data in the front-end log-based storage. The method further includes, providing the front-end log deduplication service to perform a data deduplication operation on the new data while the new data resides within the front-end log-based storage. The method further includes, after the data deduplication operation is performed on the new data, updating the back-end storage to indicate storage of the new data within the back-end storage.

In some arrangements, providing the front-end log deduplication service to perform the data deduplication operation on the new data while the new data resides within the front-end log-based storage includes generating a digest based on the new data to uniquely distinguish the new data from other data. This digest may be suitable for use in deduplication of data exclusively within the front-end log-based storage, or even throughout all of the data storage equipment.

In some arrangements, providing the front-end log deduplication service to perform the data deduplication operation on the new data while the new data resides within the front-end log-based storage further includes comparing the digest to a plurality of digests to determine whether a copy of the new data already exists.

In some arrangements, the plurality of digests includes a front-end log index containing a group of entries. Each entry uniquely identifies respective data that resides in the front-end log-based storage. In these arrangements, comparing the digest to the plurality of digests may include searching the group of entries for the digest to ascertain whether a copy of the new data already exists within the front-end log-based storage.

In some arrangements, providing the front-end log deduplication service to perform the data deduplication operation on the new data while the new data resides within the front-end log-based storage further includes, in response to comparing the digest to the plurality of digests, outputting a positive comparison result indicating that the digest exists within the plurality of digests. In these arrangements, providing the front-end log deduplication service may further include, in response to the positive comparison result, deleting the new data from the front-end log-based storage and updating a reference to a copy of the new data.

In some arrangements, providing the front-end log deduplication service further includes, in response to comparing the digest to the plurality of digests, outputting a negative comparison result indicating that the digest does not exist within the plurality of digests. In these arrangements, providing the front-end log deduplication service may further include, in response to the negative comparison result, performing a subsequent operation to remove the new data from the front-end log-based storage.

In some arrangements, performing the subsequent operation to remove the new data from the front-end log-based storage includes writing the new data to the back-end storage and deleting the new data from the front-end log-based storage.

In some arrangements, performing the subsequent operation to remove the new data from the front-end log-based storage further includes placing the digest in a global index of digests. In these arrangements, each digest of the global index of digests uniquely identifies respective data that resides in the back-end storage.

In some arrangements, the method further includes performing a background deduplication operation that, based on the global index of digests, attempts to find a copy of the new data within the back-end storage to deduplicate the new data.

In some arrangements, performing the subsequent operation to remove the new data from the front-end log-based storage includes performing a second deduplication operation that attempts to find a copy of the new data within the back-end storage.

In some arrangements, performing the second deduplication operation includes searching a global index of digests for the digest to determine whether a copy of the new data already exists within the back-end storage. In these arrangements, each digest of the global index of digests uniquely identifying respective data that resides in the back-end storage.

In some arrangements, performing the second deduplication operation further includes, in response to searching the global index of digests for the digest, outputting a positive search result indicating that the digest exists within the global index of digests. In these arrangements, performing the second deduplication operation may further include, in response to the positive search result, deleting the new data from the front-end log-based storage and updating a reference to a copy of the new data.

In some arrangements, performing the second deduplication operation further includes, in response to searching the global index of digests for the digest, outputting a negative search result indicating that the digest does not exists within the global index of digests. In these arrangements, performing the second deduplication operation may further include, in response to the negative search result, flushing the new data from the front-end log-based storage to the back-end storage and placing the digest in the global index of digests.

In some arrangements, the front-end log-based storage and the back-end storage form part of a data storage system. In these arrangements, the new data may be provided from a host computer for storage by the data storage system. Here, the method may further include, after receiving the new data in the front-end log-based storage and prior to completing the data deduplication operation on the new data while the new data resides within the front-end log-based storage, sending an acknowledgement to the host computer to confirm persistent storage of the new data within the data storage system. Accordingly, there is no delay in acknowledging completion of the write operation to the host computer.

In some arrangements, wherein the front-end log-based storage is configured and operative to store host data from a set of host computers in a log-based journaling manner prior to the host data reaching the back-end storage. Since log-based journaling involves writing data to a next available location with little or no updating of metadata, the operation of persisting the received data is streamlined and thus acknowledgement can be provided extremely fast.

In some arrangements, the method further includes, after the front-end log deduplication service is activated, detecting a high write activity event. Here, the method may further include, in response to detection of the high write activity event, deactivating the front-end log deduplication service that is configured and operative to perform deduplication operations on data in the front-end log-based storage. Accordingly, deduplication may be turned off in certain situations (e.g., in response to an alert, if the system is under distress, etc.).

In some arrangements, the method further includes, after the front-end log deduplication service is deactivated, detecting a low write activity event and, in response to detection of the low write activity event, reactivating the front-end log deduplication service that is configured and operative to perform deduplication operations on data in the front-end log-based storage. Accordingly, deduplication may continue after the certain situations have passed.

Another embodiment is directed to data storage equipment which includes a communications interface, memory, and control circuitry coupled to the communications interface and the memory. The memory stores instructions which, when carried out by the control circuitry, cause the control circuitry to:
(A) activate a front-end log deduplication service that is configured and operative to perform deduplication operations on data in front-end log-based storage prior to the data reaching back-end storage that is different from the front-end log-based storage,
(B) after the front-end log deduplication service is activated, receive new data in the front-end log-based storage through the communications interface,
(C) provide the front-end log deduplication service to perform a data deduplication operation on the new data while the new data resides within the front-end log-based storage, and
(D) after the data deduplication operation is performed on the new data, update the back-end storage to indicate storage of the new data within the back-end storage.

Yet another embodiment is directed to a computer program product having a non-transitory computer readable medium which stores a set of instructions to perform best-effort deduplication. The set of instructions, when carried out by computerized circuitry, cause the computerized circuitry to perform a method of:
(A) activating a front-end log deduplication service that is configured and operative to perform deduplication operations on data in front-end log-based storage prior to the data reaching back-end storage that is different from the front-end log-based storage;
(B) after the front-end log deduplication service is activated, receiving new data in the front-end log-based storage;
(C) providing the front-end log deduplication service to perform a data deduplication operation on the new data while the new data resides within the front-end log-based storage; and
(D) after the data deduplication operation is performed on the new data, updating the back-end storage to indicate storage of the new data within the back-end storage.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in best-effort deduplication of data while the data resides in a front-end log.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing deduplication operations on data while that data resides in a front-end log along the input/output (I/O) path that leads to back-end storage (e.g., secondary storage). Such operations enable host I/O requests to be acknowledged as completed as soon as the data reaches the front-end log and thus does not impose any delays. Furthermore, such operations may eliminate storing multiple copies of the data in back-end storage which could then lead to inefficiencies (e.g., processing more data in a subsequent deduplication process, more reading and evaluating stored metadata, etc.). Also, such operations can be applied in a best-effort manner so that the deduplication service may be deactivated under certain situations (e.g., due to data building up in the front-end log, if there are no available processing cycles available for deduplication, etc.).

Figure 1:
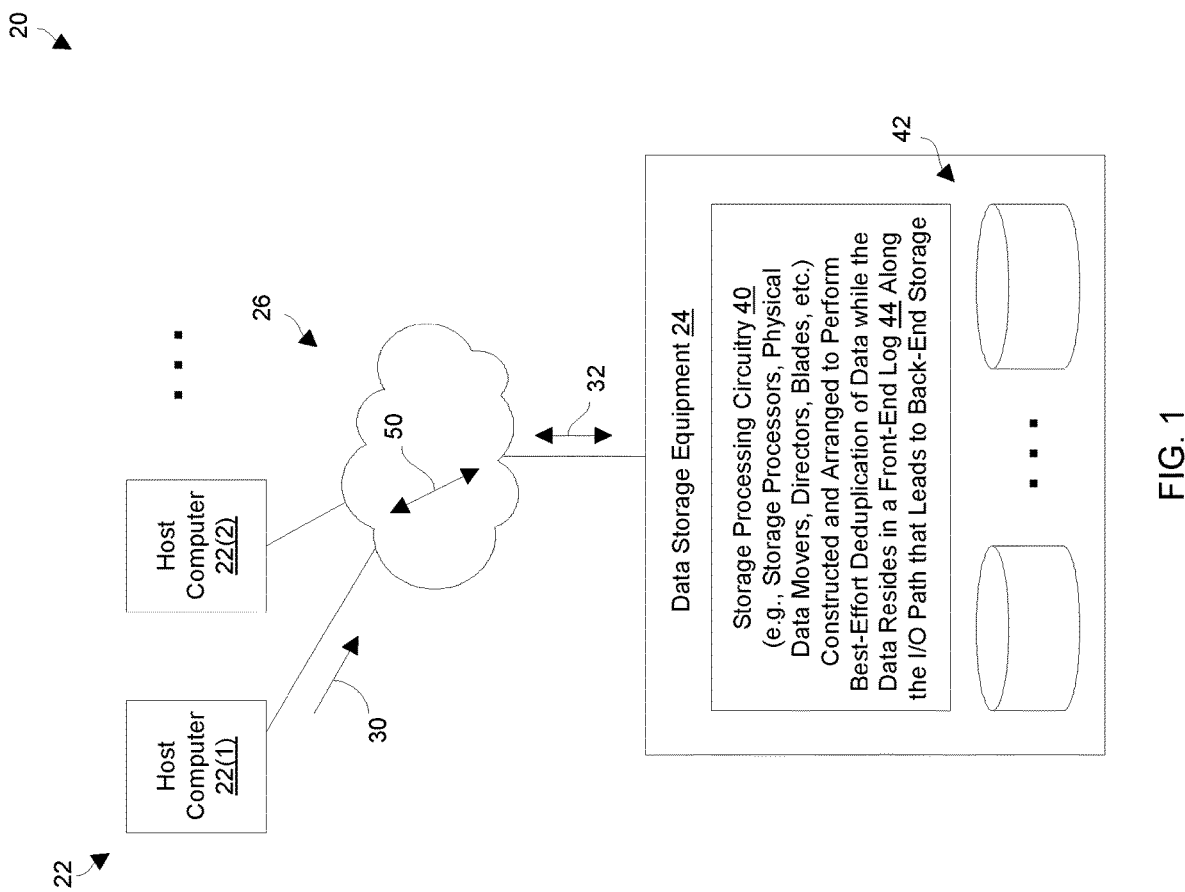
FIG. 1 is a block diagram of a data storage environment which performs best-effort deduplication of data while the data resides in a front-end log along the I/O path that leads to back-end storage.

FIG. 1 is a block diagram of a data storage environment 20 which performs best-effort deduplication of data while the data resides in a front-end log along the I/O path that leads to back-end storage. The data storage environment 20 includes a set of host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the array of storage devices 42. Additionally, the storage processing circuitry 40 performs deduplication operations of data while the data resides in a front-end log 44 along the I/O path that leads to the array of storage devices 42. Accordingly, the data storage equipment 24 is able to enjoy certain efficiencies and optimizations such as maintaining fast acknowledgement of write operation completion and saving of storage space in the array of storage devices 42.

In some arrangements, the best-effort deduplication of data while the data resides in a front-end log 44 is independent of any other deduplication that is performed by the data storage equipment 24 (e.g., other inline deduplication, background deduplication, etc.). In other arrangements, the best-effort deduplication of data while the data resides in a front-end log 44 works with one or more other forms of deduplication that is performed by the data storage equipment 24 (e.g., digests generated by deduplication of data while the data resides in a front-end log 44 may be used later in background deduplication, and so on).

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 stores host data 32 to the array of storage devices 42 and loads host data 32 from the array of storage devices 42 in response to the I/O requests 30. Additionally, storage processing circuitry 40 performs best-effort deduplication of data while the data resides in a front-end log 44. Further details will now be provided with reference to FIG. 2.

Figure 2:
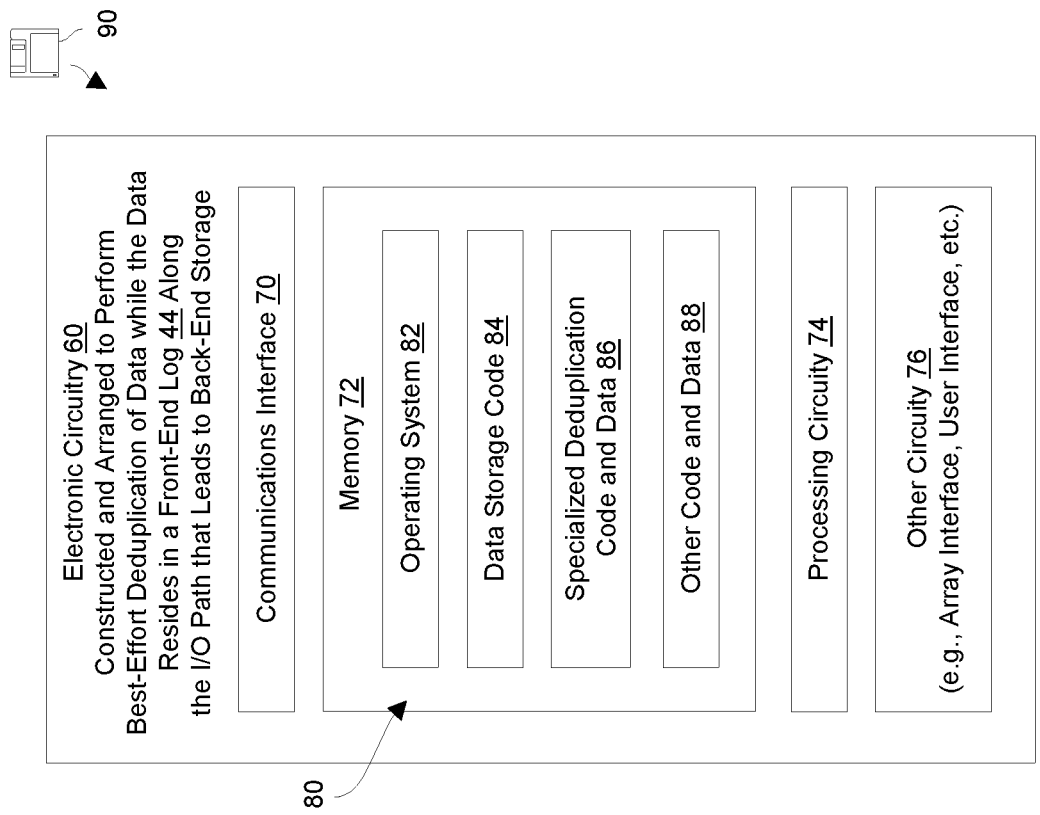
FIG. 2 is a block diagram of data storage equipment of the data storage environment of FIG. 1.

FIG. 2 shows particular details of electronic circuitry 60 which forms the storage processing circuitry 40 of the data storage equipment 24 (also see FIG. 1) that provides a front-end log deduplication service in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system code 82, data storage code 84, specialized deduplication code and data 86, as well as other code and data 88.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The data storage code 84 refers to the instructions that are involved in routine data storage operations (e.g., write and read operations). The data storage code 84 may include operating parameters, drivers, other metadata, etc. that form one or more portions of the I/O stack, mapping tables, and so on. In some arrangements, the data storage code 84 is tightly integrated with the operating system code 82 (e.g., a kernel).

The specialized deduplication code and data 86 refers to specialized instructions that provides deduplication service which is constructed and operative to deduplicate data while the data resides in a front-end log 44. In some arrangements, the specialized deduplication code and data 86 includes an index of digests that uniquely identify portions of the data (e.g., data blocks) residing in the front-end log 44. Accordingly, the index can be search for a digest identifying particular data to determine whether the particular data resides in the front-end log 44. If the digest is found in the index, a copy of the particular data already resides in the front-end log 44. Otherwise, the particular data is the first instance in the front-end log 44.

The other code and data 88 refers to various other instructions, parameters, data, etc. For example, the data storage equipment 24 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as perform deduplication of data within the front-end log 44.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 and 4.

Figure 3:
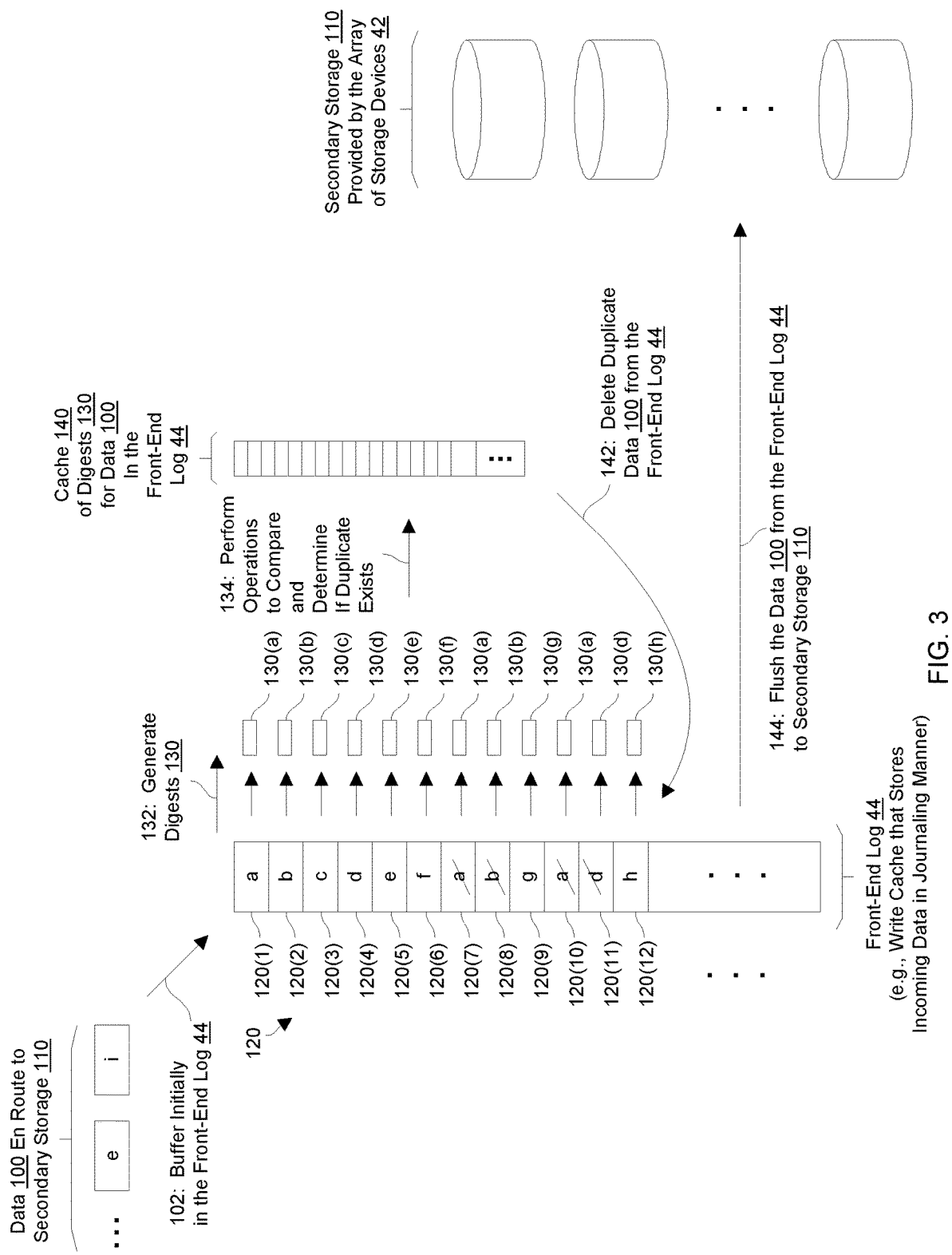
FIG. 3 is a block diagram illustrating particular details of the deduplication process from the perspective of the front-end log.
Figure 4:
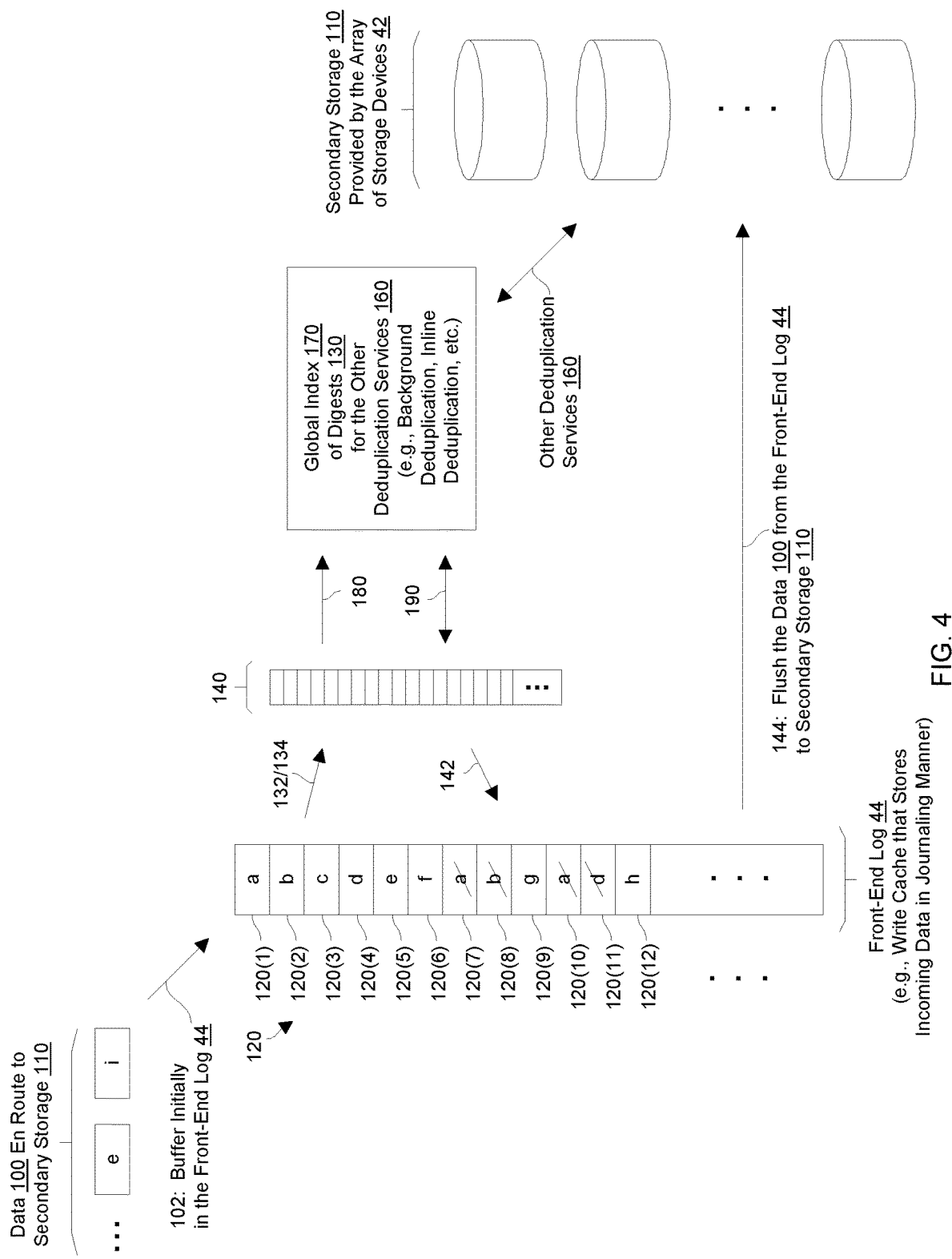
FIG. 4 is a block diagram illustrating particular details of the deduplication process when combined with another deduplication service of the environment.

FIGS. 3 and 4 show particular details of the deduplication process. In particular, FIG. 3 shows certain details of the deduplication process with regard to the front-end log 44. FIG. 4 shows certain details of the deduplication process when combined (or integrated) with another deduplication service of the data storage equipment 24.

With attention initially on FIG. 3, the storage processing circuitry 40 initially buffers data 100 (also see the host data 32 in FIG. 1), which is en route to secondary storage (or non-volatile back-end storage) 110, in the front-end log 44. As shown (see arrow 102), the front-end log 44 is a series of storage locations 120(1), 120(2), 120(3), . . . (collectively, storage locations 120) that holds the data 100.

In some arrangements, the front-end log 44 provides persistent data storage. A variety of persistent storage mechanisms are suitable for use such as using flash memory, battery backup memory, cache mirroring, combinations thereof, etc. Accordingly, the storage processing circuitry 40 can acknowledge write operations as soon as the storage processing circuitry 40 stores the data 100 in the front-end log 44 for faster response times without waiting until the data 100 is finally stored in the secondary storage 110.

Additionally, in some arrangements, the storage processing circuitry 40 performs log-based storage (or journaling) operations by storing the data 100 in the next available location 120 of the front-end log 44. Such operation enables the storage processing circuitry 40 to acknowledge write operations quickly (i.e., there is minimal latency and less metadata to update compared to storing data in the random access secondary storage 110).

While the data 100 resides within the front-end log 44 and is waiting to be flushed to the secondary storage 110, the storage processing circuitry 40 generates a digest (or fingerprint) 130 for each portion of data (or datum) (see arrow 132). In some arrangements, the storage processing circuitry 40 generates a digest 130 for each data block thus enabling deduplication at the block level. For example, the storage processing circuitry 40 generates digest 130(a) for data block "a", digest 130(b) for data block "b", digest 130(c) for data block "c", and so on. However, other levels of deduplication granularity are suitable for use as well such as multiple blocks (e.g., two, three, four, etc.), at the stripe level, at the slice level, and so on.

It should be understood that a variety of well-known algorithms (e.g., hashing functions) are suitable for use in generating the digests 130. The particular algorithm should enable quick digest creation and provide confidence or guarantees that the digests 130 uniquely identify different data 100.

After the storage processing circuitry 40 generates a digest 130 based on particular data 100, the storage processing circuitry 40 performs operations to determine whether a copy of the particular data 100 already exists within the front-end log 44 (see arrow 134). To this end, the storage processing circuitry 40 compares the digest 130 to a cache (or index) 140 of other digests 130 that the storage processing circuitry 40 maintains for other data 100 currently residing in the front-end log 44. That is, the storage processing circuitry 40 searches the other digests 130 in the cache 140 for a match and provides a comparison result indicating whether the storage processing circuitry 40 found the particular digest 130 among the other digests 130 in the cache 140.

If the digest 130 is not found among the other digests 130 in the cache 140, the comparison result is negative and the storage processing circuitry 40 concludes that there is no copy of the particular data 100 currently in the front-end log 44. Accordingly, the storage processing circuitry 40 adds the digest 130 to the cache 140 and leaves the particular data 100 in the front-end log 44 for flushing to the secondary storage 110.

However, if the digest 130 is found among the other digests 130 in the cache 140, the comparison result is positive and the storage processing circuitry 40 concludes that there is already copy of the particular data 100 currently in the front-end log 44. Accordingly, the storage processing circuitry 40 does not add the digest 130 to the cache 140. Instead, the storage processing circuitry 40 deletes (see arrow 142) one of the instances of the particular data 100 (e.g., the newest instance) and updates references (e.g., metadata) to indicate that the particular data 100 in the front-end log 44 is for multiple write operations. The slashes "/" through the letters of the duplicate data blocks "a", "b", and "d" illustrate removal of the duplicate data blocks from the front-end log 44. As a result, the location within the front-end log 44 is now free to hold other data 100 en route to the secondary storage 110 and less memory of the secondary storage will be consumed while storing the particular data 100.

In due course, the storage processing circuitry 40 flushes the data 100 that resides in the front-end log 44 to the secondary storage 110 (see the arrow 144). Such operation may be performed by a separate portion of the I/O path. During the flushing operation, the particular data 100 is removed from the front-end log 44 thus freeing the front-end log 44 to hold further data 100. Once the storage processing circuitry 40 removes the data 100 from the front-end log 44, the storage processing circuitry 40 also removes the corresponding digest(s) 130 from the cache 140.

It should be understood that the storage processing circuitry 40 performs deduplication using the front-end log 44 as a front-end log deduplication service which can be turned on and off. In particular, while the pipeline for the data 100 en route to the secondary storage 110 remains healthy, the storage processing circuitry 40 activates the front-end log deduplication service which attempts to deduplicate copies of data 100 within the front-end log 44. However, if for some reason the front-end log 44 encounters a high write activity event, the storage processing circuitry 40 may deactivate the front-end log deduplication service. Accordingly, the front-end log deduplication service may be viewed as a best-effort process and not mandatory.

It should be understood that a variety of different situations may trigger determination of the high write activity event. For example, the storage processing circuitry 40 may maintain a predefined memory availability threshold for the front-end log 44. If the amount of remaining memory availability threshold falls below that threshold (e.g., 10%, 5%, etc.), the storage processing circuitry 40 concludes that the data 100 in the front-end log 44 is backing up to an unhealthy level and turns off the front-end log deduplication service. Other triggers are suitable for use such as receipt of an indication that the data storage equipment 24 is running on backup power and is employing a policy that requires immediate flushing all data within the front-end log 44 to the secondary storage 110 as quickly as possible, and so on.

FIG. 4 shows certain enhancements or embellishments that are available in accordance with certain embodiments. In particular, the deduplication process that was earlier-described with reference to FIG. 3 can be combined or integrated with other deduplication services that may be available within the data storage equipment 24.

As shown in FIG. 4 (see the double arrow 160), a second deduplication process operates within the data storage equipment 24 and accesses a global index 170 of digests 130. This second deduplication process may be a form of inline deduplication (e.g., performed later in the I/O path), offline or background deduplication, combinations thereof, etc.

Although the second deduplication process may operate independently of the earlier-described deduplication process with reference to FIG. 3, synergies may exist that can be exploited to improve both processes. For example, the digests 130 that are used by the second deduplication process may be created using the same technique that generates the digests 130 used for deduplication of data 100 within the front-end log 44. If such compatibility exists, the digests 130 may be shared between deduplication processes.

In some arrangements, the digests 130 that are created by the front-end log deduplication service are not deleted from the cache 140. Rather, as shown by the arrow 180 in FIG. 4, the digests 130 that are removed from the cache 130 are utilized by the second deduplication service to determine whether an instance of the data 100 leaving the front-end log 44 already exists within the secondary storage 110 (e.g., perhaps that data 100 was flushed from the front-end log 44 to the secondary storage 110 while the front-end log deduplication service was deactivated).

In some arrangements, such second deduplication processing occurs while the data 100 is still en route to the secondary storage 110. Accordingly, this is a form of inline deduplication that uses the digest 130 created while the data was in the front-end log 44. Here, perhaps after earlier deduplication was performed which may have been successful or unsuccessful, the second deduplication process searches the global index 170 of digests 130 for the particular digest 130 for the particular data 100 en route from the front-end log 44 to the secondary storage 110.

If the digest 130 is not found among the other digests 130 in the global index 170, the comparison result is negative and the storage processing circuitry 40 concludes that there is no copy of the particular data 100 currently in the secondary storage 110. Accordingly, the storage processing circuitry 40 adds the digest 130 to the global index 170 and stores the particular data 100 in the secondary storage 110.

However, if the digest 130 is found among the other digests 130 in the global index 170, the comparison result is positive and the storage processing circuitry 40 concludes that there is already copy of the particular data 100 currently in the secondary storage 110. Accordingly, the storage processing circuitry 40 does not add the digest 130 to the global index 170. Rather, the storage processing circuitry 40 updates references (e.g., metadata) to indicate that the particular data 100 that is already in the secondary storage represents the same data 100 for the current write operation. As a result, there is less secondary storage 110 consumed while storing the particular data 100.

It should be understood that the digests 130 that are generated by front-end log deduplication service alleviate the need to re-generate the digests 130 at a subsequent time. Accordingly, even a background deduplication process may benefit since the extra work of generating digests 130 for data at rest within the secondary storage 110 is unnecessary if the digests 130 have already been created by the front-end log deduplication service.

In some arrangements, the digests 130 are automatically added to the global index 170 when data 100 is removed from the front-end log 44. In these arrangements, a background deduplication process searches the global index 170 for duplicate digest entries which indicate corresponding duplicate data 100 stored within the secondary storage 110. Here, when the background deduplication process finds multiple of the same digest 130 within the global index 170, the background deduplication process saves just once instance of the data 100 within the secondary storage 110 (deleting the copies of the data 100), updates metadata to indicate that the single instance of the data 100 within secondary storage 110 represents multiple stored instances of the data 100, and updates the global index 170 to hold just a single instance of the digest 130.

In some arrangements, the digests 130 from the global index 170 may be searched by the front-end log deduplication service while attempting to deduplicate data 100 while the data 100 is still within the front-end log 44. That is, suppose that at least a portion of the global index 170 is currently cached by the storage processing circuitry 40 for the second deduplication process (e.g. background deduplication, inline deduplication, etc.). During this time, since the digests 130 of the global index 170 are cached, the storage processing circuitry 40 may as well search both the digests 130 of the cache 140 (i.e., the digests 130 corresponding to data within the front-end log 44) as well as the digests 130 that are cached for the second deduplication process. This augmentation of the digests 130 that are searched by the front-end log deduplication service is illustrated by the double arrow 190 in FIG. 4. Further details will now be provided with reference to FIG. 5.

Figure 5:
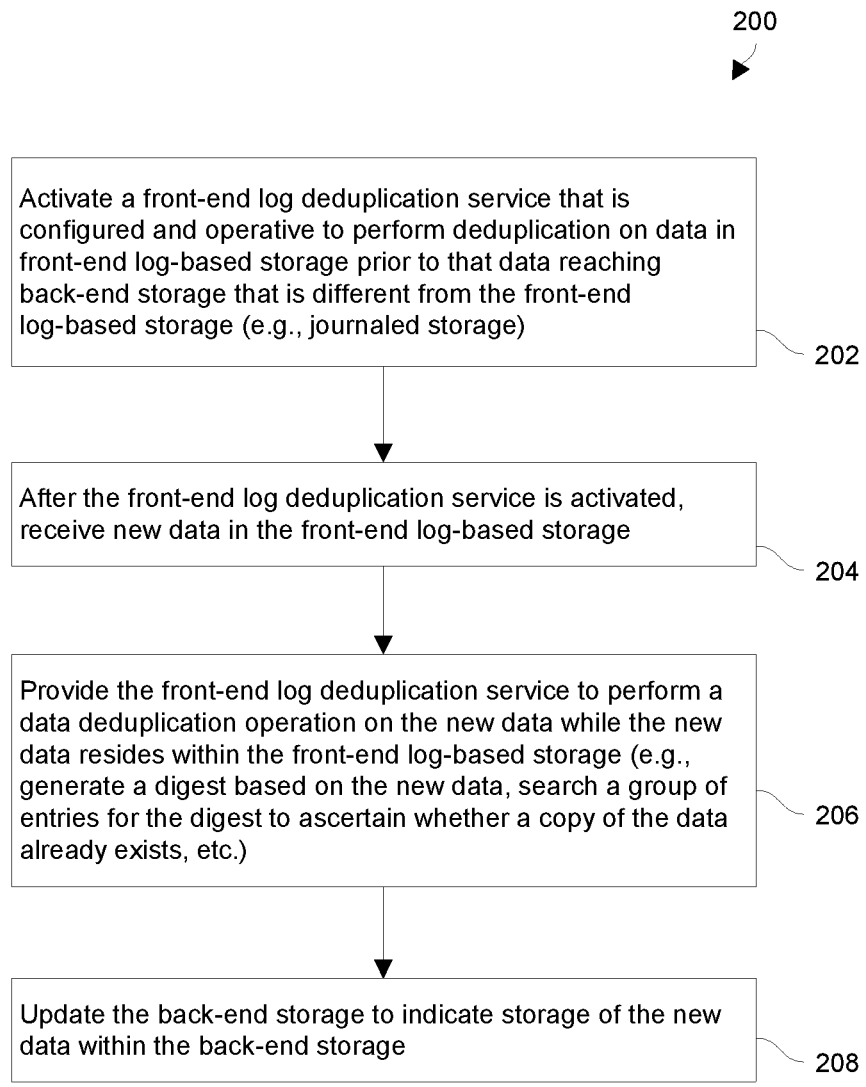
FIG. 5 is a flowchart of a procedure which is performed by the data storage equipment of FIG. 2.

FIG. 5 is a flowchart of a best-effort deduplication procedure 200 which is performed by the storage processing circuitry 40 when processing I/O requests from a set of host computers. At 202, the storage processing circuitry 40 activates a front-end log deduplication service that is configured and operative to perform deduplication operations on data in front-end log-based storage prior to that data reaching back-end (or secondary) storage that is different from the front-end log-based storage.

At 204, after the front-end log deduplication service is activated, the storage processing circuitry 40 receives new data in the front-end log-based storage. Here, the storage processing circuitry 40 buffers the new data for further processing in the I/O path but can immediately confirm completion of the write operation thus providing low write latency (also see arrow 102 in FIG. 3).

At 206, the storage processing circuitry 40 provides the front-end log deduplication service to perform a data deduplication operation on the new data while the new data resides within the front-end log-based storage. Here, the storage processing circuitry 40 generates a digest based on the new data to uniquely distinguish the new data from other data (also see arrow 132 in FIG. 3), and searches a cache of entries holding digests identifying other data to ascertain whether a copy of the new data already exists within the front-end log-based storage (also see arrow 134 in FIG. 3).

At 208, after the data deduplication operation is performed on the new data, the storage processing circuitry 40 updates the back-end storage to indicate storage of the new data within the back-end storage (also see arrows 142 and 144 in FIG. 3). In particular, if a second copy of the data already exists, the storage processing circuitry 40 creates a reference to represent the extra instance of the data and deletes that instance of the data from the front-end log-based storage. However, if a second copy of the data does not already exist, the storage processing circuitry 40 adds the digest to the cache and leaves the new data in the front-end log-based storage for flushing to the back-end storage and the new data is ultimately stored within the back-end storage (e.g., as described earlier).

It should be understood that the front-end log deduplication service may be deactivated and reactivated over time depending on how the data storage equipment 24 is operating (e.g., based on performance, alerts, events, etc.). Moreover, the front-end log deduplication service may be integrated or operate cooperatively with other services such as other deduplication services, auto-tiering services, other compression services, and so on.

As described above, improved techniques are directed to performing a deduplication operation on data 100 while that data 100 resides in a front-end log 44 along the input/output (I/O) path that leads to back-end storage (e.g., secondary storage) 110. Such operation enables I/O transactions to be acknowledged as completed as soon as the data 100 reaches the front-end log and thus does not impose any delays. Additionally, such operation may eliminate storing multiple copies of the data 100 in back-end storage 110 which could then lead to inefficiencies (e.g., processing more data in a subsequent deduplication process, reading and evaluating stored metadata, etc.). Moreover, such operation can be applied in a best-effort manner so that the deduplication service may be deactivated under certain situations (e.g., due to data building up in the front-end log, if there are no available processing cycles available for deduplication, etc.).

One should appreciate that the above-described techniques do not merely store data. Rather, the disclosed techniques involve improvements to the technology of data storage. Along these lines, with such techniques, advantages are available such as compression, minimizing storage consumption, alleviating the need to generate digests more than once, augmenting/embellishing existing deduplication services, and so on.

It should be appreciated that there may be drawbacks to conventional deduplication of data inline (as the data arrives). In particular, to identify deduplication candidates, digest comparison of all of the data in secondary storage is performed and the index for all of the data is so large that the entire index cannot fit into main memory. Rather, only portions of the index are brought into main memory at any one time thus decreasing the speed of ingesting data into secondary storage.

To address this issue, some conventional inline deduplication approaches attempts to exploit the temporal and locality of accesses as shown by research. In these conventional approaches, the digest of inline data is matched only to a portion of the index based on logic/calculations. Unfortunately, placing such logic inside the I/O path is undesirable because it may significantly slow down data ingestion.

However, in accordance with some embodiments, with the above-described improved deduplication of data within the front-end log 44, the data has already been robustly and reliably stored and thus the improved deduplication does not affect data placement speed. Such improved deduplication enables deduplication of duplicate data within the front-end log 44 itself. Depending on the ingestion speed and the available resources (required for a full index lookup), the improved deduplication may provide deduplication efficiency up to the level achievable for the stream. In any case, it will not block or reduce the speed of I/O processing. Moreover, such improved deduplication can benefit from all the techniques available to exploit the temporal locality of the processed data.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described techniques indicate reliance on the digests 130 completely, by way of example only. That is, the actual data is not compared. Example digests 130 utilize SHA-1, SHA-2, and the like.

In other embodiments, the techniques involve digest comparison at first and, if matching digests 130 are found, the storage processing circuitry 40 performs a comparison of the content of the corresponding blocks (e.g., bit-by-bit comparison). Such operation enables use of weaker digests 130 that may identify possible duplicate data. If the storage processing circuitry 40 determines that the data is not the same during actual data comparison, deduplication is not performed.

It should be further understood that digest calculation while the data is in the front-end log 44 may consume very few cycles and is performed very quickly. That is, all of the data for possible deduplication is already loaded into main memory thus alleviating the need to read data from the back-end storage 110.

In some embodiments, the storage processing circuitry 40 generates digests 130 from data within the front-end log 44 but, if time and resources allow, searches the global index 170 to find deduplication candidates within the back-end storage 110. Here, the digest comparison may provide a "hint" to the rest of the system, i.e., identifying suspected duplicate blocks that have been already flushed from the front-end log 44. In such situations, the storage processing circuitry 40 may complete the deduplication process (e.g., bit-by-bit data comparison) in either an in-line or an offline manner.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of performing best-effort deduplication, the method comprising:
   activating a front-end log deduplication service that is configured and operative to perform deduplication operations on data in front-end log-based storage prior to that data reaching back-end storage that is different from the front-end log-based storage;
   after the front-end log deduplication service is activated, receiving new data in the front-end log-based storage;
   providing the front-end log deduplication service to perform a data deduplication operation on the new data while the new data resides within the front-end log-based storage; and
   after the data deduplication operation is performed on the new data, updating the back-end storage to indicate storage of the new data within the back-end storage;
   wherein the front-end log-based storage and the back-end storage form part of a data storage system;
   wherein the new data is provided from a host computer for storage by the data storage system; and
   wherein the method further comprises:
   after receiving the new data in the front-end log-based storage and prior to completing the data deduplication operation on the new data while the new data resides within the front-end log-based storage, sending an acknowledgement to the host computer to confirm persistent storage of the new data within the data storage system.

2. A method as in claim 1 wherein providing the front-end log deduplication service to perform the data deduplication operation on the new data while the new data resides within the front-end log-based storage includes:
   generating a digest based on the new data to uniquely distinguish the new data from other data.

3. A method as in claim 2 wherein providing the front-end log deduplication service to perform the data deduplication operation on the new data while the new data resides within the front-end log-based storage further includes:
   comparing the digest to a plurality of digests to determine whether a copy of the new data already exists.

4. A method as in claim 3 wherein the plurality of digests includes
   a front-end log index containing a group of entries, each entry uniquely identifying respective data that resides in the front-end log-based storage; and
   wherein comparing the digest to the plurality of digests includes:
   searching the group of entries for the digest to ascertain whether a copy of the new data already exists within the front-end log-based storage.

5. A method as in claim 4 wherein providing the front-end log deduplication service to perform the data deduplication operation on the new data while the new data resides within the front-end log-based storage further includes:
   in response to comparing the digest to the plurality of digests, outputting a positive comparison result indicating that the digest exists within the plurality of digests, and
   in response to the positive comparison result, deleting the new data from the front-end log-based storage and updating a reference to a copy of the new data.

6. A method as in claim 4 wherein providing the front-end log deduplication service to perform the data deduplication operation on the new data while the new data resides within the front-end log-based storage further includes:
   in response to comparing the digest to the plurality of digests, outputting a negative comparison result indicating that the digest does not exist within the plurality of digests, and
   in response to the negative comparison result, performing a subsequent operation to remove the new data from the front-end log-based storage.

7. A method as in claim 6 wherein performing the subsequent operation to remove the new data from the front-end log-based storage includes:
   writing the new data to the back-end storage and deleting the new data from the front-end log-based storage.

8. A method as in claim 7 wherein performing the subsequent operation to remove the new data from the front-end log-based storage further includes:
   placing the digest in a global index of digests, each digest of the global index of digests uniquely identifying respective data that resides in the back-end storage.

9. A method as in claim 8, further comprising:
   performing a background deduplication operation that, based on the global index of digests, attempts to find a copy of the new data within the back-end storage to deduplicate the new data.

10. A method as in claim 6 wherein performing the subsequent operation to remove the new data from the front-end log-based storage includes:
    performing a second deduplication operation that attempts to find a copy of the new data within the back-end storage.

11. A method as in claim 10 wherein performing the second deduplication operation includes:
    searching a global index of digests for the digest to determine whether a copy of the new data already exists within the back-end storage, each digest of the global index of digests uniquely identifying respective data that resides in the back-end storage.

12. A method as in claim 11 wherein performing the second deduplication operation further includes:
    in response to searching the global index of digests for the digest, outputting a positive search result indicating that the digest exists within the global index of digests, and
    in response to the positive search result, deleting the new data from the front-end log-based storage and updating a reference to a copy of the new data.

13. A method as in claim 11 wherein performing the second deduplication operation further includes:
    in response to searching the global index of digests for the digest, outputting a negative search result indicating that the digest does not exists within the global index of digests, and
    in response to the negative search result, flushing the new data from the front-end log-based storage to the back-end storage and placing the digest in the global index of digests.

14. A method as in claim 1 wherein the front-end log-based storage is configured and operative to store host data from a set of host computers in a log-based journaling manner prior to the host data reaching the back-end storage.

15. A method as in claim 1, further comprising:
    after the front-end log deduplication service is activated, detecting a high write activity event, and
    in response to detection of the high write activity event, deactivating the front-end log deduplication service that is configured and operative to perform deduplication operations on data in the front-end log-based storage.

16. A method as in claim 15, further comprising:
    after the front-end log deduplication service is deactivated, detecting a low write activity event, and
    in response to detection of the low write activity event, reactivating the front-end log deduplication service that is configured and operative to perform deduplication operations on data in the front-end log-based storage.

17. A method as in claim 1, further comprising:
    selectively turning the front-end log deduplication service off and on based on a current amount of available space in the front-end log-based storage.

18. Data storage equipment, comprising:
    a communications interface;
    memory; and
    control circuitry coupled to the communications interface and the memory, the memory storing instructions which, when carried out by the control circuitry, cause the control circuitry to:
       activate a front-end log deduplication service that is configured and operative to perform deduplication operations on data in front-end log-based storage prior to the data reaching back-end storage that is different from the front-end log-based storage,
       after the front-end log deduplication service is activated, receive new data in the front-end log-based storage through the communications interface,
       provide the front-end log deduplication service to perform a data deduplication operation on the new data while the new data resides within the front-end log-based storage, and
       after the data deduplication operation is performed on the new data, update the back-end storage to indicate storage of the new data within the back-end storage;
    wherein the front-end log-based storage and the back-end storage form part of a data storage system;
    wherein the new data is provided from a host computer for storage by the data storage system; and
    wherein the control circuitry is further constructed and arranged to:
       after receiving the new data in the front-end log-based storage and prior to completing the data deduplication operation on the new data while the new data resides within the front-end log-based storage, send an acknowledgement to the host computer to confirm persistent storage of the new data within the data storage system.

19. A computer program product having a non-transitory computer readable medium which stores a set of instructions to perform best-effort deduplication; the set of instructions, when carried out by computerized circuitry, causing the computerized circuitry to perform a method of:
    activating a front-end log deduplication service that is configured and operative to perform deduplication operations on data in front-end log-based storage prior to the data reaching back-end storage that is different from the front-end log-based storage;
    after the front-end log deduplication service is activated, receiving new data in the front-end log-based storage;
    providing the front-end log deduplication service to perform a data deduplication operation on the new data while the new data resides within the front-end log-based storage; and
    after the data deduplication operation is performed on the new data, updating the back-end storage to indicate storage of the new data within the back-end storage;
    wherein the front-end log-based storage and the back-end storage form part of a data storage system;
    wherein the new data is provided from a host computer for storage by the data storage system; and
    wherein the method further comprises:
       after receiving the new data in the front-end log-based storage and prior to completing the data deduplication operation on the new data while the new data resides within the front-end log-based storage, sending an acknowledgement to the host computer to confirm persistent storage of the new data within the data storage system.

* * * * *